United States Patent
Ma et al.

(10) Patent No.: US 7,941,862 B2
(45) Date of Patent: May 10, 2011

(54) DATA ACCESS METHOD AGAINST CRYPTOGRAPH ATTACK

(75) Inventors: Chung-Hsun Ma, Hsin-Chu Hsien (TW); Chin-Ling Wang, Hsin-Chu Hsien (TW); Hon-Wai Ng, Hsin-Chu Hsien (TW); Shu-Hua Wang, Hsin-Chu Hsien (TW)

(73) Assignee: Phison Electronics Corp., Hsinchu (TW)

( * ) Notice: Subject to any disclaimer, the term of this patent is extended or adjusted under 35 U.S.C. 154(b) by 1069 days.

(21) Appl. No.: 11/730,958

(22) Filed: Apr. 5, 2007

(65) Prior Publication Data
US 2008/0250249 A1    Oct. 9, 2008

(51) Int. Cl.
*G06F 21/00* (2006.01)

(52) U.S. Cl. ............... 726/28; 726/2; 726/4; 726/21; 726/26; 726/27

(58) Field of Classification Search ............ 726/2, 4, 726/21, 26–28
See application file for complete search history.

(56) References Cited

U.S. PATENT DOCUMENTS

| | | | | |
|---|---|---|---|---|
| 6,880,054 | B2 * | 4/2005 | Cheng et al. | 711/164 |
| 7,039,759 | B2 * | 5/2006 | Cheng et al. | 711/115 |
| 7,461,407 | B2 * | 12/2008 | Little et al. | 726/27 |
| 2006/0005049 | A1 * | 1/2006 | Randell | 713/193 |

* cited by examiner

*Primary Examiner* — Brandon S Hoffman
*Assistant Examiner* — Helai Salehi
(74) *Attorney, Agent, or Firm* — Bacon & Thomas, PLLC

(57) ABSTRACT

The present invention discloses a data access method accomplished by the following steps of: creating a predetermined password; generating a first encryption key; encrypting data based on the first encryption key; prompting for the predetermined password upon receipt of an access request; decoding a header of the NAND flash memory based on a user-entered password; examining the header to determine whether a mapping between the user-entered password and the first encryption key is defined; and decrypting and outputting the data by a decryption key when the mapping between the user-entered password and the first encryption key is defined.

20 Claims, 5 Drawing Sheets

DATA ACCESS METHOD AGAINST CRYPTOGRAPH ATTACK

FIELD OF THE INVENTION

The present invention relates to a data access method, and more particularly, to a secure data access method for applications in a data storage apparatus.

BACKGROUND OF THE INVENTION

Revolutionary changes in our communication vehicles brought about by the amazing growth of the Internet and the ever-increasing digitization of information, pose unprecedented threats to personal security and privacy. An increasing amount of sensitive information is now circulating in electronic form, including E-mails, facsimile messages, telephone conversations, fund transfers, trade secrets and other personal records. The same technological advances have brought enormous benefits to humankind, but also make us more vulnerable to unwanted and potentially dangerous snooping. A number of new applications for those computer storage devices have emerged, and many of these have a need for enhancing the overall security of information stored in the computer storage devices.

FIG. 1 to FIG. 3 are schematic diagrams of a secure storage device and operation of the same according to U.S. Pat. No. 6,880,054 to Cheng et al. The flash memory 4, as shown in FIG. 1, is divided into a number of different sections or zones. Typically, the flash memory is divided into two zones: zone 1 is for setting a software serial number, and zone 2 is used typically for storing a user's data. Besides, each zone has a unique password. Referring now to FIG. 2, it is a flow diagram showing the initial set-up of a password for zone 2 of the flash memory 4 by an end user. To set up the password for zone 2 the user plugs in 20 the device 10 into a USB port on the computer and communication 21 is established between the computer and the device 10. The user then runs the driver software and the driver software enters a password installation set-up mode 23 for zone 2. The user then enters 28 a password that they wish to use to prevent unauthorized access to zone 2 of the flash memory 4. The password entered is then encrypted 29 and stored 30 in the flash memory 4.

After an end user has performed the initial password set up procedure described above and shown in FIG. 2, when the user selects zone 2 to access data stored in the flash memory 4 (see FIG. 3), the micro-controller 3 sends a command to the computer to request 46 the user to enter the password for zone 2. When the user enters the password, the computer sends the password to the micro-controller 3. The micro-controller 3 retrieves the password for zone 2 from the flash memory 4, decrypts 47 the password and compares it with the password entered by the user. If the password entered by the user is incorrect, the operation returns to step 46 and the computer requests 46 the user for the password again. If the password entered by the user is correct, the user has access to zone 2 of the flash memory 4 to read data from the flash memory 4 and to write data to the flash memory 4. However, data can only be written to the flash memory 4 if the manual switch 7 is in the position to permit data to be written to the flash memory 4. In order to read or write data from or to the flash memory 4 a read or write command is sent 48 by the computer in USB format to the micro-controller 3. In response to the read or write command the micro-controller 3 either retrieves 49 data from the flash memory 4 and sends it to the driver 2 for conversion 50 to PC format and then to be output to the computer or receives data from the driver to write it to the flash memory 4.

The micro-controller 3 then determines 51 whether the read or write operation is complete. If the operation is not complete it returns to step 49. If the operation is complete the operation terminates 52.

While U.S. Pat. No. 6,880,054 employs the method of comparing the user-supplied password and the stored password to limit access to the data in the flash memory, the disadvantage is that code breakers eventually decipher the password through "trial-and-error" time after time. Besides, once the flash memory 4 stored with the password is compromised or dismantled, malicious code breakers can easily access the data. Therefore, the prior art could not ensure the utmost confidentiality of the data in the storage device. Hence, there is a resulting need for a secure data access method to avoid potential leakage of the private data. Unlike conventional data access method, such as that of U.S. Pat. No. 6,880,054, the present invention takes a step ahead in enhancing the confidentiality of the digital data through generation of a password-based encryption key, and further encrypting the pre-stored data into ciphertext with the encryption key, to eliminate chances of intruders deciphering the key after many times of "trial-and-error".

SUMMARY OF THE INVENTION

In light of the prior art limited by the above problems, it is an object of the present invention to provide a secure data access method for use with a data read/write device.

In accordance with an aspect of the present invention, a data access method applied in a data storage apparatus having at least one NAND flash memory for use with a data read/write device, a data access method comprising the steps of: a) creating a predetermined password; b) generating a first encryption key; c) encrypting data based on the first encryption key; d) prompting for the predetermined password upon receipt of an access request; e) decoding a header of the NAND flash memory based on a user-entered password; f) examining the header to determine whether a mapping between the user-entered password and the first encryption key is defined; and g) decrypting and outputting the data by a decryption key when the mapping between the user-entered password and the first encryption key is defined.

Preferably, the decoding step comprises step of translating the user-entered password into a second encryption key for decoding the header.

Preferably, the data access method further comprises step of prompting for the predetermined password when the mapping between the user-entered password and the first encryption key is not defined.

Certainly, the first and second encryption keys translated from the passwords can be accomplished by software or hardware.

Typically, the header comprises a first logical block.

Certainly, the first and second encryption keys can be revised by the data read/write device.

Certainly, the decryption key can be revised by the data read/write device.

Alternatively, the first and second encryption keys each has a length of 64 bits, 128 bits, 192 bits, or 256 bits.

Alternatively, the decryption key has a length of 64 bits, 128 bits, 192 bits, or 256 bits.

Certainly, the data are encrypted according to Advanced Encryption Standard (AES), Data Encryption Standard (DES), Triple-DES, and RSA.

Alternatively, the data storage apparatus includes a Universal Serial Bus (USB) PenDrive, a Smart Digital (SD) card, a MultiMedia Card (MMC), a Compact Flash (CF) card, and a USB flash drive.

In accordance with another aspect of the present invention, a data access method for a data storage apparatus having at least one NAND flash memory in communication with a data read/write device comprises the steps of: prompting for a predetermined password upon receipt of an access request for data; translating a user-entered password into an encryption key; decoding a header of the NAND flash memory based on the encryption key; examining the header to determine whether a mapping between the user-entered password and a predetermined encryption key is defined; and decrypting and outputting the data by a decryption key when the mapping between the user-entered password and the predetermined encryption key is defined.

Preferably, the predetermined encryption key is translated in accordance with the predetermined password.

Preferably, the data access method further comprises step of prompting for the predetermined password when the mapping between the user-entered password and the predetermined encryption key is not defined.

Certainly, the encryption key and the predetermined encryption key translated from the passwords can be accomplished by software or hardware.

Typically, the header comprises a first logical block.

Certainly, the encryption key and the predetermined encryption key can be revised by the data read/write device.

Certainly, wherein the decryption key can be revised by the data read/write device.

Alternatively, the encryption key and the predetermined encryption key each has a length of 64 bits, 128 bits, 192 bits, or 256 bits.

Alternatively, the decryption key has a length of 64 bits, 128 bits, 192 bits, or 256 bits.

Certainly, the data are encrypted according to Advanced Encryption Standard (AES), Data Encryption Standard (DES), Triple-DES, and RSA.

Alternatively, the data storage apparatus comprises a USB PenDrive, a SD card, a MMC, a CF card, and a USB flash drive.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENTS

The present invention discloses a data storage apparatus and a data access method for application in the same. The objects and advantages of the present invention will become more readily apparent to those ordinarily skilled in the art after reviewing the following detailed description. The present invention needs not be limited to the following embodiments.

Figure 1:
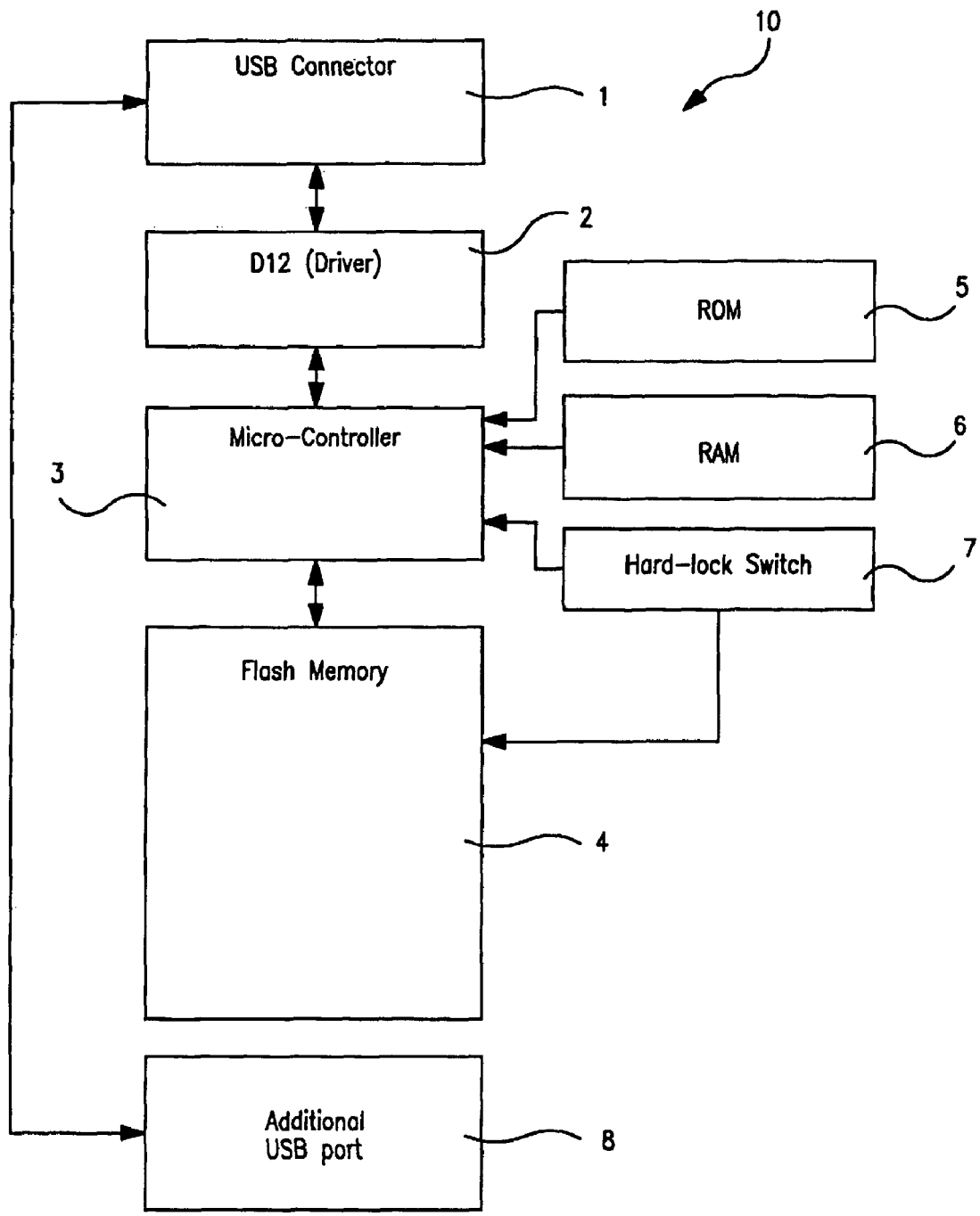
FIG. 1 is a schematic block diagram of a data storage device according to the prior art.
Figure 2:
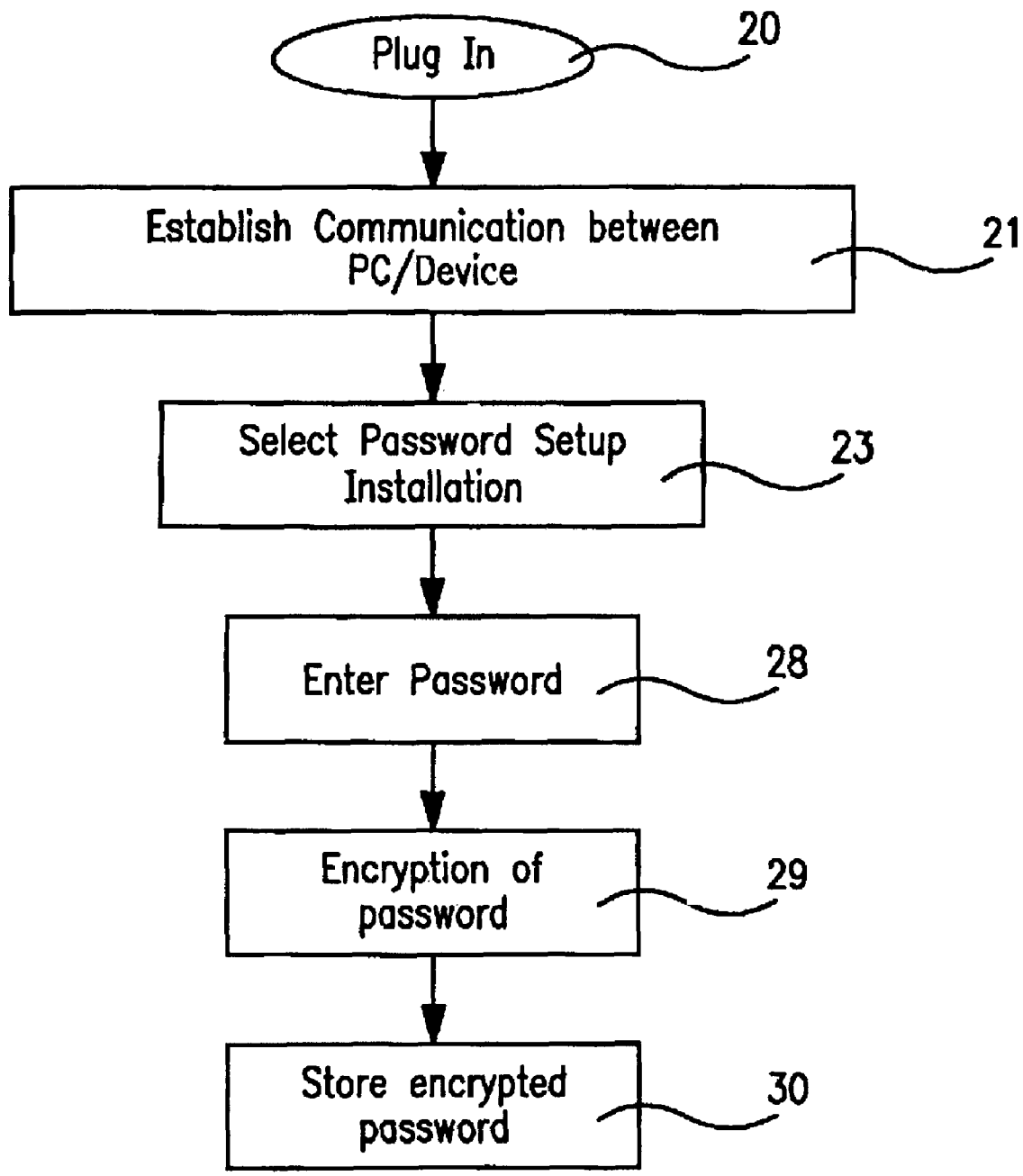
FIG. 2 is a flow diagram showing the initial step of the data storage device by an end user according to the prior art.
Figure 3:
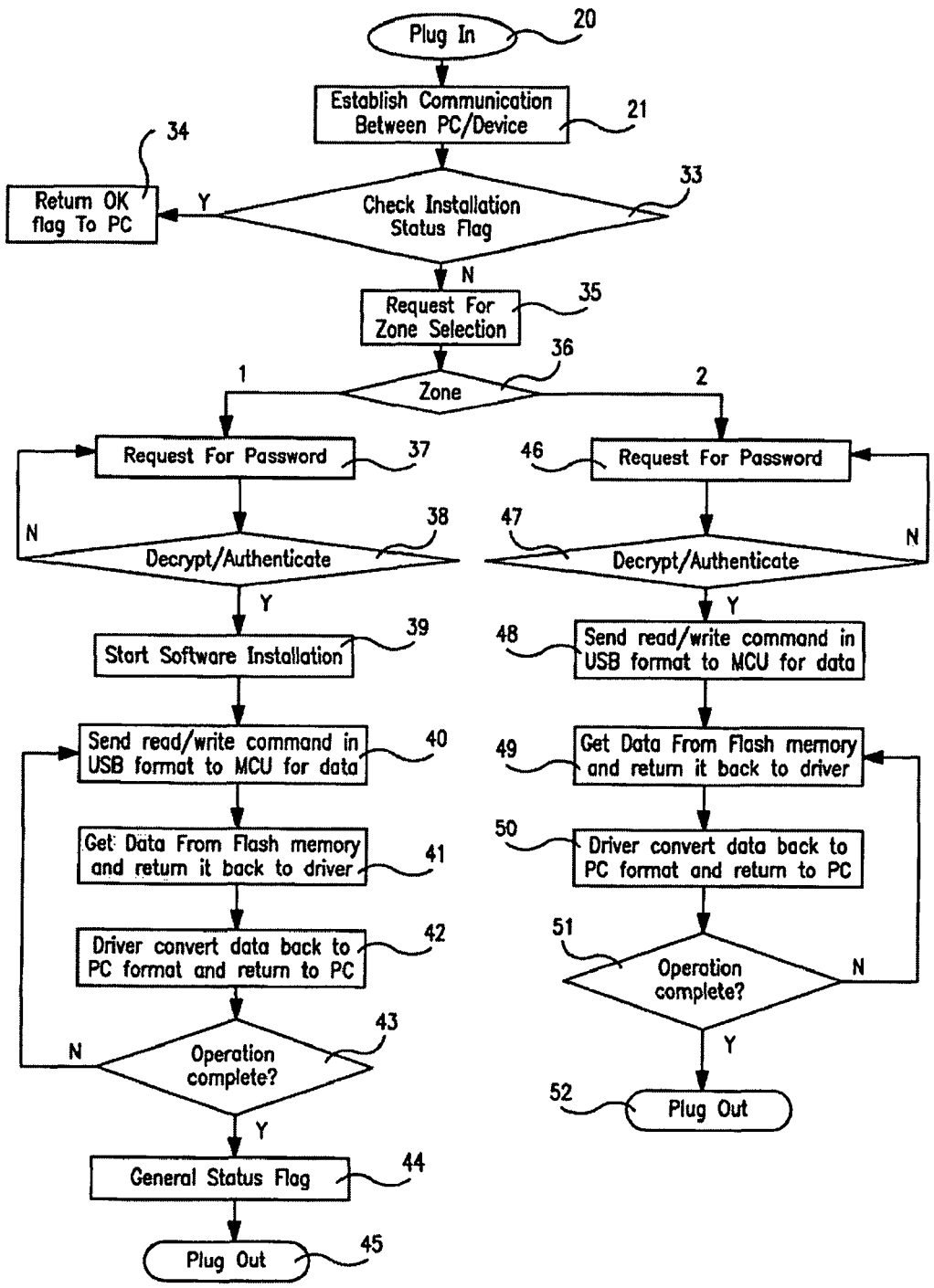
FIG. 3 is a flow diagram showing operation of the prior data storage device.
Figure 4:
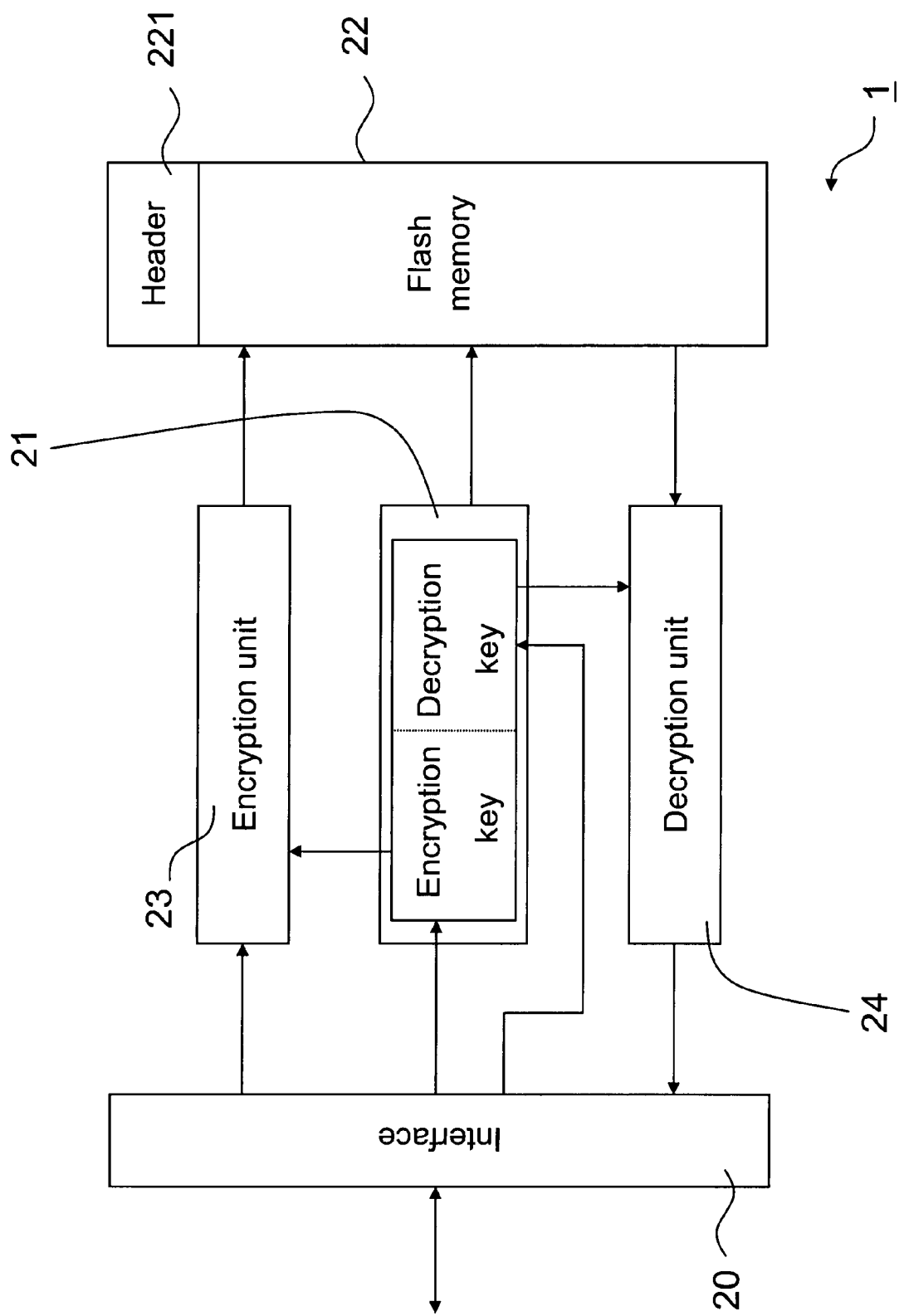
FIG. 4 is a schematic diagram of a data storage apparatus according to the present invention.

Please refer to FIG. 4. It illustrates a secure architecture of a data storage apparatus according to the present invention. As shown in FIG. 4, the data storage apparatus 1 includes an interface 20 coupled to a data read/write device (not shown) for data buffering and transmitting therebetween, a non-volatile memory 21, a flash memory 22 for storing data, an encryption unit 23, and a decryption unit 24, which would be expatiated in the follow-up descriptions.

The non-volatile memory 21 is stored with an encryption key and a decryption key. Each of the keys is a field of bits used to encrypt and decrypt data using techniques known to those of skill in the art. By adoption of cryptograph algorithms, the above-identified keys are generated on the basis of a user-supplied password, usually a combination of number digits. By applying the bit values of the keys to those of the data and conducting logical operations associated with selected encryption algorithms, inclusive of Advanced Encryption Standard (AES), Data Encryption Standard (DES), Triple-DES, and RSA (Rivest-Shamir-Adleman), the encryption unit 23 and the decryption unit 24 are operable to perform encryption and decryption of the data in accordance with the encryption key and decryption key. Certainly, both keys can be revised by the read/write device. In this embodiment, both keys are 'symmetrical' (both encryption and decryption use the same key), yet in alternate embodiments, both keys can be 'asymmetrical' (encryption and decryption keys are different). Each of the key is encrypted and decrypted at the 128-bit level in this embodiment, while the 64-bit, 196-bit, or 256-bit key is acceptable to implement the present invention. In addition, the flash memory 22 includes a header portion 221, containing a BIOS Parameter Block (BPB). The BPB is used to describe file system format of a disk volume. Typical file systems with BPB include FAT (File Allocation Table) 16, and FAT32. BPB keeps important file system parameters so that BIOS (Basic Input Output System) can use those parameters to access the data stored in the disk. There is an 8-byte field in the BPB identifying the file system type, and a string for the first 3 bytes of this field must be of "FAT" in this embodiment, to verify the file system as a correct FAT file system. In alternate embodiments, the specific string(s) for that field of BPB can be located in a similar way for NTFS or other non-FAT file systems.

According to the present invention, the flash memory 22 built in the storage apparatus 1 has one-way communication with the encryption unit 23 and the decryption unit 24, during the operations of encrypting and decrypting data, respectively. The flash memory 22 is dedicated to receiving the encrypted data from the encryption unit 23 after the encryption operation, while transmitting the encrypted data to the decryption unit 24 prior to the decryption operation. The encryption unit 23 utilizes the encryption key of the non-volatile memory 21 for data encryption. Likewise, the decryption unit 24 utilizes the decryption key of the non-volatile memory 21 for data decryption.

Figure 5:
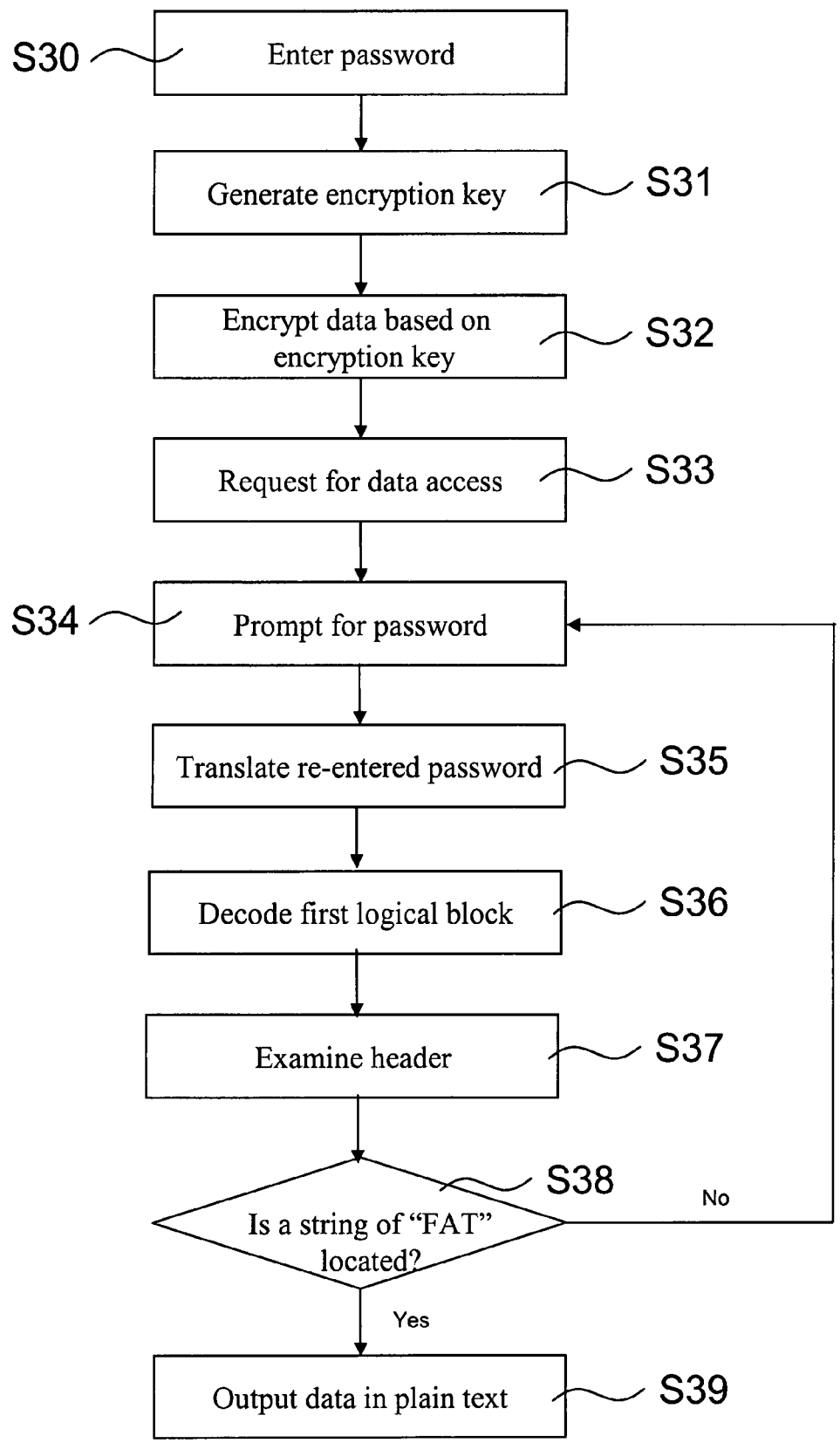
FIG. 5 is a flowchart of controlling data access according to the present invention.

In FIG. 5, it illustrates a preferred embodiment of a data access method for a data storage apparatus according to the present invention. In this embodiment, the data storage apparatus of the present invention and a read/write device are employed. Alternate embodiments may use additional or different facilities to perform the operation.

The data storage apparatus 1, such as a USB flash drive, is coupled to a read/write device through an interface 20 for data stream therebetween. As shown in step S30 of FIG. 5, a password is entered and a data is transmitted through the read/write device to initiate the following implementation of the present data access method. In this embodiment, a given algorithm, AES is employed for implementing data encryption, thus the encryption and decryption use a single key. Namely, encryption and decryption keys are 'symmetrical' (both encryption and decryption use the same key). In alternate embodiments, both keys can be 'asymmetrical' (encryption and decryption keys are different). Accordingly, the password of 48 bits is further translated into a first encryption key of 128 bits by adding 80 additional bits of key length in accordance with a predetermined scientific discipline, and stored in a non-volatile memory 21 at step S31 of FIG. 5. Each of the key is generated at the 128-bit standard in this embodiment, while the 64-bit, 196-bit, or 256-bit key is acceptable to implement the data access method. Prior to transmitting the data to be encrypted through the interface 20 from the data read/write device to a flash memory 22, the encryption unit 23 adopts a given encryption algorithm, e.g., AES of 128 bits, along with the first encryption key in the non-volatile memory 21, and then transforms the data in plaintext to a scrambled ciphertext, i.e., an encrypted data, as illustrated in step S32 of FIG. 5. In addition to AES, the data can be encrypted according to Rivest-Shamir-Adleman (RSA), Data Encryption Standard (DES), and Triple-DES.

As discussed above, steps S30 to S32 are operations of encrypting, while operations of decrypting begin with S33 of FIG. 5. To regulate access to the data, re-enter of the password is required to decrypt the encrypted data stored in the flash memory 22. After requesting access to the data at step S33, a checkbox prompts for re-entering of password on the read/write device, as shown at step S34 of FIG. 5. The data in its encrypted form which is unintelligible to unauthorized intruders, is released responsively. To decrypt the encrypted data and enable readout of the decrypted data through the interface 20 outbound to the data read/write device, a decryption key corresponding to the first encryption key is required. Steps S35 to S36 are to illustrate the translation of the re-entered password into a second encryption key for decoding the header 221. In the header 221, there is an 8-byte field in the BPB of the first logical block (LBA0), employed to identify the file system type, i.e. FAT in this embodiment. After the decoding, the header 221, also known as the first logical block, is examined to locate a string of "FAT" at the first 3 bytes at steps S37 and S38. If a mapping between the first encryption key and the re-entered password is defined, the 8-byte field in the BPB of the first logical block is successfully translated, and a string of "FAT" is located in the first 3 bytes of the filed at step S38.

Otherwise, step S38 would return to step S34 if a string of "FAT" is not successfully translated and located, and a checkbox prompts for password again on the read/write device if no mapping is defined. As a string of "FAT" is located in the BPB field of the header 221, a particular level of security clearance is granted. Therefore, the data access request of step S33 is allowed, and the decryption key is retrieved to decrypt the encrypted data at the decryption unit 24. Resultantly, the data is restored to its original plain text, and unfolded to the read/write device through the interface 20, as shown in step S39 of FIG. 5. Even the flash memory 22 is compromised, or dismantled from the storage apparatus 1 to assemble with another storage apparatus, the encrypted data remains ciphered without the correct decryption key.

Certainly, the encryption and the decryption operations discussed above can be accomplished either by software or hardware implementation. In alternate embodiments, the password can be predeterminedly created on manufacturers' site, and users can revise the password on the read/write device. The properties of the present invention make it especially well-suited to applications of a USB PenDrive, a SD card, a MMC, a CF card, and a USB flash drive. Besides, the header of the flash memory bearing information about how the data is processed, is preferably partitioned in the FAT format.

In conclusion, the present invention discloses a data access method for applications in data storage apparatus, to ensure confidential information from falling into wrong hands, in particular the industrial espionage among highly competitive businesses. Differentiated from the prior art, the data in encrypted form is released at the first place before the password is verified, even though an incorrect password is entered. The present invention further utilizes the file-system-dependent information recorded in the header, i.e. the first logical block, to escalate the protection and integrity of the data. Besides, the password can be further translated into an encryption key with a key length of 64-bit, 128-bit, 196-bit, or 256-bit key. If the password is verified incorrect or invalid, it suggests that no mapping be defined. Accordingly, the data remains in encrypted state, which is unintelligible to unauthorized persons, to prevent leakage of the data brought about by compromise of the encryption key after a significant amount of calculation and many times of "trial-and-error" for the possible key. Only when the entered password conforms to the encryption key based on the information of the header, the encrypted data can be decrypted successfully in decipherable text. The present invention ensures that transitory data stored in a memory remains confidential, and eliminates the prior potential security holes by prohibiting malicious key-loggers from deciphering the key, thereby dramatically enhancing overall security of digital contents.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A data access method used with a data storage apparatus having at least one NAND flash memory, the method comprising the steps of:
   creating a predetermined password;
   generating a first encryption key based on the predetermined password;
   encrypting data with an encryption unit of the data storage apparatus based on the first encryption key;
   prompting for the predetermined password upon receipt of an access request;
   decoding a header of the NAND flash memory based on a user-entered password;
   examining the decoded header to determine whether a mapping between the user entered password and the first encryption key is defined; and
   decrypting and outputting the data by a decryption key when the mapping between the user-entered password and the first encryption key is defined.

2. The data access method according to claim 1, wherein the decoding step comprises step of translating the user-entered password into a second encryption key for decoding the header.

3. The data access method according to claim 1, further comprising step of prompting for the predetermined password when the mapping between the user-entered password and the first encryption key is not defined.

4. The data access method according to claim 1, wherein the header is in a first logical block.

5. The data access method according to claim 1, wherein the decryption key is the same as the first encryption key.

6. The data access method according to claim 1, wherein the data are encrypted according to Advanced Encryption Standard (AES), Data Encryption Standard (DES), Triple-DES, and Rivest-Shamir-Adleman (RSA).

7. The data access method according to claim 1, wherein the data storage apparatus comprises a Universal Serial Bus (USB) Penprive, a Smart Digital (SD) card, a MultiMedia Card (MMC), a Compact Flash (CF) card, and a USB flash drive.

8. The data access method according to claim 2, wherein the first and second encryption keys translated from the passwords can be accomplished by software or hardware.

9. The data access method according to claim 2, wherein the first, second encryption keys, and the decryption key can be revised by a data read/write device.

10. The data access method according to claim 2, wherein the first, second encryption keys, and the decryption key each has a length of 64 bits, 128 bits, 192 bits, or 256 bits.

11. A data access method used with a data storage apparatus having at least one NAND flash memory, the method comprising the steps of:
    prompting for a predetermined password upon receipt of an access request for data;
    translating a user-entered password into an encryption key;
    decoding a header of the NAND flash memory based on the encryption key;
    examining the decoded header to determine whether a mapping between the user entered password and a predetermined encryption key is defined; and
    decrypting the data with an decryption unit of the data storage apparatus utilizing a decryption key and outputting the data when the mapping between the user-entered password and the predetermined encryption key is defined.

12. The data access method according to claim 11, wherein the predetermined encryption key is translated in accordance with the predetermined password.

13. The data access method according to claim 11, further comprising step of prompting for the predetermined password when the mapping between the user-entered password and the predetermined encryption key is not defined.

14. The data access method according to claim 11, wherein the encryption key and the predetermined encryption key translated from the passwords can be accomplished by software or hardware.

15. The data access method according to claim 11, wherein the header is in a first logical block.

16. The data access method according to claim 11, wherein the encryption key, the predetermined encryption key, and the decryption key can be revised by a data read/write device.

17. The data access method according to claim 11, wherein the decryption key is the same as the predetermined encryption key.

18. The data access method according to claim 11, wherein the encryption key, the predetermined encryption key and the decryption key each has a length of 64 bits, 128 bits, 192 bits, or 256 bits.

19. The data access method according to claim 11, wherein the data are encrypted according to Advanced Encryption Standard (AES), Data Encryption Standard (DES), Triple-DES, and Rivest-Shamir-Adleman (RSA).

20. The data access method according to claim 11, wherein the data storage apparatus comprises a USB Penprive, a SD card, a MMC, a CF card, and a USB flash drive.

* * * * *